(12) United States Patent
Shao et al.

(10) Patent No.: US 10,969,348 B2
(45) Date of Patent: Apr. 6, 2021

(54) DEVICE AND METHOD FOR MEASURING IN-SITU TIME-RESOLVED X-RAY ABSORPTION SPECTRUM

(71) Applicant: Shanghai Institute of Optics And Fine Mechanics, Chinese Academy of Sciences, Shanghai (CN)

(72) Inventors: Jianda Shao, Shanghai (CN); Shijie Liu, Shanghai (CN); Shenghao Wang, Shanghai (CN)

(73) Assignee: Shanghai Institute of Optics And Fine Mechanics, Chinese Academy of Sciences, Shanghai (CN)

( * ) Notice: Subject to any disclaimer, the term of this patent is extended or adjusted under 35 U.S.C. 154(b) by 29 days.

(21) Appl. No.: 16/569,570

(22) Filed: Sep. 12, 2019

(65) Prior Publication Data

US 2020/0003706 A1    Jan. 2, 2020

Related U.S. Application Data

(63) Continuation of application No. PCT/CN2017/089248, filed on Jun. 20, 2017.

(30) Foreign Application Priority Data

May 5, 2017    (CN) .......................... 201710312948.4

(51) Int. Cl.
*G01N 23/083*    (2018.01)

(52) U.S. Cl.
CPC ....... *G01N 23/083* (2013.01); *G01N 2223/04* (2013.01); *G01N 2223/313* (2013.01); *G01N 2223/502* (2013.01)

(58) Field of Classification Search
CPC .. G01N 23/06; G01N 23/083; G01N 2223/04; G01N 2223/041;

(Continued)

(56) References Cited

U.S. PATENT DOCUMENTS 7,321,425 B2    1/2008 Haran
2013/0329270 A1  12/2013 Nielsen et al.
(Continued)

FOREIGN PATENT DOCUMENTS

CN    1587929 A    3/2005
CN    1749741 A    3/2006
(Continued)

OTHER PUBLICATIONS

M. Newville et al., "Analysis of multiple-scattering XAFS data using theoretical standards," *Physica B*, vol. 208, pp. 154-156 (1995).

(Continued)

*Primary Examiner* — Mark R Gaworecki
(74) *Attorney, Agent, or Firm* — Mei & Mark LLP; Mann Li

(57) ABSTRACT

Device and method for measuring in-situ time-resolved X-ray absorption spectrum. The device comprises an X-ray source, a first slit, an acousto-optic tunable X-ray filter, a radio frequency transmitter, a second slit, a front ionization chamber, a front ionization chamber signal amplifier, a sample to be tested, a rear ionization chamber, a rear ionization chamber signal amplifier, a data collector, and a computer. The X-ray source, the acousto-optic tunable X-ray filter, and the radio frequency transmitter are used to generate a monochromatic X-ray beam; the front ionization chamber is used to measure the intensity of the X-ray beam before passing through the sample; the rear ionization chamber is used to measure the intensity of the X-ray beam after passing through the sample; the front ionization chamber signal amplifier, the rear ionization chamber signal amplifier, the data collector, and the computer are used for data acquisition and data processing.

3 Claims, 2 Drawing Sheets

(58) Field of Classification Search
CPC ..... G01N 2223/1013; G01N 2223/313; G01N 2223/502
See application file for complete search history.

(56) References Cited

U.S. PATENT DOCUMENTS

2017/0184737 A1* 6/2017 Dujmic ............... G01V 5/0016
2018/0231416 A1 8/2018 Roscher et al.

FOREIGN PATENT DOCUMENTS

| CN | 101285764 A | 10/2008 |
|---|---|---|
| CN | 202486075 U | 10/2012 |
| CN | 103076352 A | 5/2013 |
| JP | S5776441 A | 5/1982 |
| JP | 2010032341 A | 2/2010 |
| JP | 2013190226 A | 9/2013 |

OTHER PUBLICATIONS

D. C. Koningsberger et al., "XAFS spectroscopy; fundamental principles and data analysis," *Topics in Catalysis*, vol. 10, pp. 143-155 (2000).

F. Cimini et al.,"QEXAFS investigation of the particle growth of PtRh clusters supported on NaY," *Journal of Physical Chemistry B*, vol. 101, pp. 5277-5284 (1997).

C. Geantet et al., "In situ QEXAFS investigation at Co K-edge of the sulfidation of a CoMo/Al2O3 hydrotreating catalyst," *Catalysis Letters*, vol. 73, pp. 95-98 (2001).

R. Cattaneo et al., "QEXAFS study of the sulfidation of NiMo/Al2O3 hydrotreating catalysts," *Journal of Synchrotron Radiation*, vol. 8, pp. 158-162 (2001).

D. Lutzenkirchen-Hecht et al., "Monitoring of fast transformations in solid state chemistry and heterogeneous catalysis by QEXAFS in the second scale," *Physica Scripta*, vol. T115, pp. 831-833 (2005).

M. A. Newton et al., "Restructuring of supported Pd by green solvents: an operando quick EXAFS (QEXAFS) study and implications for the derivation of structure-function relationships in Pd catalysis," *Catalysis Science & Technology*, vol. 6, pp. 8525-8531 (2016).

R. Frahm, "Quick Scanning EXAFS—1st Experiments," *Nuclear Instruments & Methods in Physics Research Section a—Accelerators Spectrometers Detectors and Associated Equipment*, vol. 270, pp. 578-581 (1988).

R. Frahm, "New Method for Time-Dependent X-Ray Absorption Studies," *Review of Scientific Instruments*, vol. 60, pp. 2515-2518 (1989).

T. Matsushita et al., "A fast x-ray absorption spectrometer for use with synchrotron radiation," *Japanese Journal of Applied Physics*, vol. 20, pp. 2223-2228 (1981).

E. Dartyge et al., "X-ray absorption in dispersive mode—a new spectrometer and a data acquisition-system for fast kinetics," *Nuclear Instruments & Methods in Physics Research Section a—Accelerators Spectrometers Detectors and Associated Equipment*, vol. 246, pp. 452-460 (1986).

Xu, Shunsheng, "Current status and prospects of X-Ray analysis," *Physics*, No. 6, pp. 321-329, (Jun. 30, 1983).

* cited by examiner

DEVICE AND METHOD FOR MEASURING IN-SITU TIME-RESOLVED X-RAY ABSORPTION SPECTRUM

CROSS-REFERENCE TO RELATED APPLICATIONS

The subject application is a continuation of PCT/CN2017/089248 filed on Jun. 20, 2017, which in turn claims priority on Chinese Application No. CN201710312948.4 filed on May 5, 2017 in China. The contents and subject matter of the PCT international application and the Chinese priority application are incorporated herein by reference.

FIELD OF TECHNOLOGY

The present invention relates to measurement for X-ray absorption spectrum, particularly, device and method for measuring in-situ time-resolved X-ray absorption spectrum.

BACKGROUND ART

X-ray absorption spectrum provides information about the microscopic local structure of matters (including electronic structure and geometric structure) and is one of the most powerful tools for depicting local structures. Time-resolved X-ray absorption spectrum can obtain intrinsic kinetic information of local atomic and electronic structures in some important natural processes, and has been widely used in materials science, life science, environmental science, and catalytic science, etc.

At present, the structure of the time-resolved X-ray absorption spectrum measurement device commonly used in the world is shown in FIG. 1, and mainly comprises an X-ray source 1, a double-crystal monochromator 2, a diaphragm 3, a front ionization chamber 4, the sample to be tested 5, a rear ionization chamber 6, and electronic components 7. Based on the time-resolved X-ray absorption spectrum measurement device, the measurement of X-ray absorption spectrum mainly includes the following steps:

(1) moving the double-crystal monochromator to the position corresponding to the initial energy point according to the energy range of the X-ray absorption spectrum to be measured;

(2) the double-crystal monochromator is continuously and uniformly moved to the position corresponding to the end energy point of the absorption spectrum to be tested, and the electronic system continuously collects the light intensity of the front ionization chamber and the rear ionization chamber according to the integration time of one point, and calculates corresponding absorption coefficient, forming a sequence of absorption coefficients;

(3) when the double-crystal monochromator moves to the position corresponding to the end energy point, data collection is stopped.

(4) According to the motion velocity of the double-crystal monochromator, the photon energy corresponding to each absorption coefficient in the absorption coefficients sequence is calculated, and X-ray absorption spectrum is obtained.

At present, the main disadvantages of the time-resolved X-ray absorption spectrum measurement device and measurement method are:

(1) During the measurement process, the mechanical structure inside the double-crystal monochromator is always in a continuous motion process, and the measurement speed of X-ray absorption spectrum is slower due to mechanical motion. For example, it takes about 4 seconds to obtain a complete EXAFS spectrum. In actual dynamic measurement environment of X-ray absorption spectrum, fast measurement of X-ray absorption spectrum energy in the order of sub-seconds or even milliseconds is required to observe the kinetic processes such as chemical reaction and material synthesis, which obviously cannot be realized by the current widely used test devices and methods.

(2) Since the double-crystal monochromator has been in continuous motion during the measurement process, the ionization chambers have been maintaining continuous data acquisition. These two actions are parallel, so the non-negligible data matching errors are often generated during the data processing process (when calculating the photon energy corresponding to each absorption coefficient in the absorption spectrum sequence), therefore generating measurement error of the absorption spectrum.

Another method for the measurement of the time-resolved X-ray absorption spectrum is to disperse components with different energy of the complex X-ray beam in one-dimensional space by a curved crystal, combining with linear CCD detector, fast measurement of X-ray absorption spectrum can be realized by one-time exposure. Since there is no movement of any mechanical components in the measurement method, ultra-fast measurement of X-ray absorption spectrum can be achieved with time resolution in the order of microseconds. However, the main disadvantages of this time-resolved measurement method are: (1) compared with the measurement method using ionization chamber, the measurement accuracy of X-ray absorption spectrum is not high because this method uses linear array CCD to realize signal acquisition; (2) measurement system has lower energy resolution; (3) the measurement band of X-ray absorption spectrum cannot be flexibly adjusted.

SUMMARY OF THE INVENTION

To solve the problems existing in the prior time-resolved X-ray absorption spectrum measurement technology, the present invention provides a device and method for measuring time-resolved X-ray absorption spectrum with fast speed and high precision.

The technical solution of the present invention is as follows:

a measurement device for in-situ time-resolved X-ray absorption spectrum, comprising: an X-ray source, a first slit, an acousto-optic tunable X-ray filter, a radio frequency transmitter, a second slit, a front ionization chamber, a front ionization chamber signal amplifier, a sample to be tested, a rear ionization chamber, a rear ionization chamber signal amplifier, a data collector, and a computer;

The first slit and the acousto-optic tunable X-ray filter are sequentially placed along the light beam emitting direction of the X-ray source; the second slit, the front ionization chamber, the sample to be tested, and the rear ionization chamber are placed sequentially along the light beam emitting direction of the acousto-optic tunable X-ray filter; the output signal of the front ionization chamber is amplified by the front ionization chamber signal amplifier, and then transmitted to the data collector; the output signal of the rear ionization chamber is amplified by the rear ionization chamber signal amplifier, and then transmitted to the data collector; the output of the data collector is connected with the input of the computer; the output of the computer is connected with the input of the radio frequency transmitter; the excitation signal sent by the radio frequency transmitter is transmitted to the acousto-optic tunable X-ray filter.

In the present invention, the acousto-optic tunable X-ray filter comprises a sound absorber (15), an X-ray crystal (16), and a piezoelectric crystal transducer (17).

The present invention also provides a method for measuring in-situ time-resolved X-ray absorption spectrum, comprising the following steps:

(1) The wavelength of photon emitted by the acousto-optic tunable X-ray filter is set to initial wavelength $\lambda_1$ by the radio frequency transmitter according to the wavelength range of the X-ray absorption spectrum to be measured ($\lambda_1$, $\lambda_n$).

(2) Through the data collector, the front ionization chamber signal amplifier and the rear ionization chamber signal amplifier, the front ionization chamber and the rear ionization chamber are used to simultaneously measure the intensity of the incident X-ray beam before passing through the sample to be tested $I_0$ and the intensity of the incident X-ray beam passes through the sample to be tested $I_1$, and the optical absorption coefficient $\mu_1$ of the sample to be tested at the wavelength $\lambda_1$ position is calculated according to the following equation;

$$\mu_{\lambda_1} = \ln\frac{I_0}{I_1} \qquad (1.1)$$

(3) The wavelengths of photon emitted by the acousto-optic tunable X-ray filter are sequentially set to $\lambda_2$, $\lambda_3$ . . . $\lambda_{n-1}$ and $\lambda_n$ by the radio frequency transmitter; step ② is repeated at each wavelength position to obtain the optical absorption coefficient $\mu_{\lambda_2}$, $\mu_{\lambda_3}$, . . . $\mu_{\lambda_{n-1}}$ and $\mu_{\lambda_n}$ at each wavelength position;

(4) The X-ray absorption spectrum of the sample to be tested in the wavelength range ($\lambda_1$, $\lambda_n$) is drawn according to the optical absorption coefficient $\mu_{\lambda_2}$, $\mu_{\lambda_3}$ . . . $\mu_{\lambda_{n-1}}$ and $\mu_{\lambda_n}$.

Compared with the commonly used measurement device and method for time-resolved X-ray absorption spectrum, the measurement device and method proposed by the present invention mainly have the following advantages:

(1) Compared with the existing measurement technology for time-resolved X-ray absorption spectrum (during the measurement process, the mechanical structure inside the double-crystal monochromator is always in a continuous motion process, and the measurement speed of X-ray absorption spectrum is slower due to mechanical motion. For example, it takes about 4 seconds to obtain a complete EXAFS spectrum), the measurement technology proposed by the present invention does not have any movement of mechanical parts during the measurement process, so that high-speed measurement of X-ray absorption spectrum can be realized, and the measurement can be completed in the order of milliseconds for the same X-ray absorption spectrum;

(2) Compared with the existing measurement technology for time-resolved X-ray absorption spectrum (the non-negligible data matching errors are often generated when calculating the photon energy corresponding to each absorption coefficient in the absorption spectrum sequence, therefore generating measurement error of the absorption spectrum), the measurement technique proposed by the present invention does not have such error source, and therefore has high measurement accuracy for X-ray absorption spectrum.

DETAILED DESCRIPTIONS OF THE INVENTION AND EMBODIMENTS

In combination with the figures and the embodiment hereunder, the present invention is described in details, but the scope of protection for the present invention is not limited to the figures and the embodiment described below.

Figure 1:
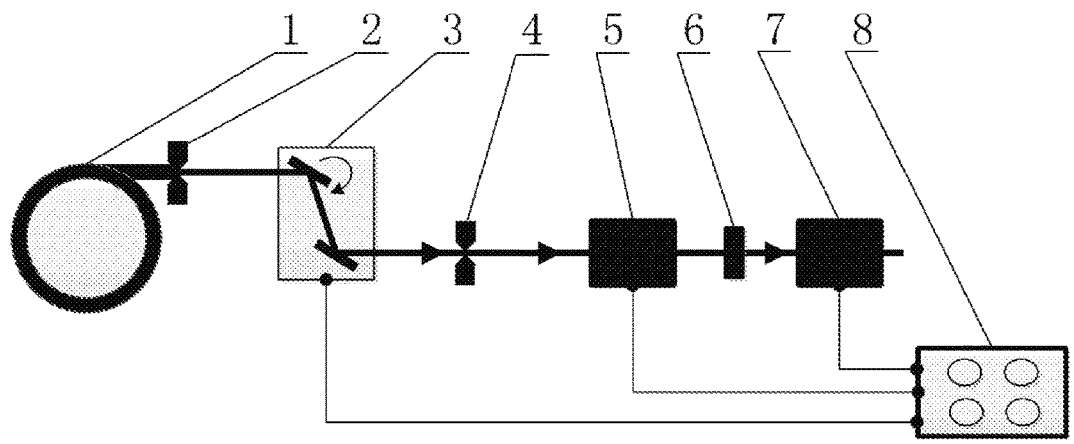
FIG. 1 shows the structure of the device for measuring time-resolved X-ray absorption spectrum in the prior art.
Figure 2:
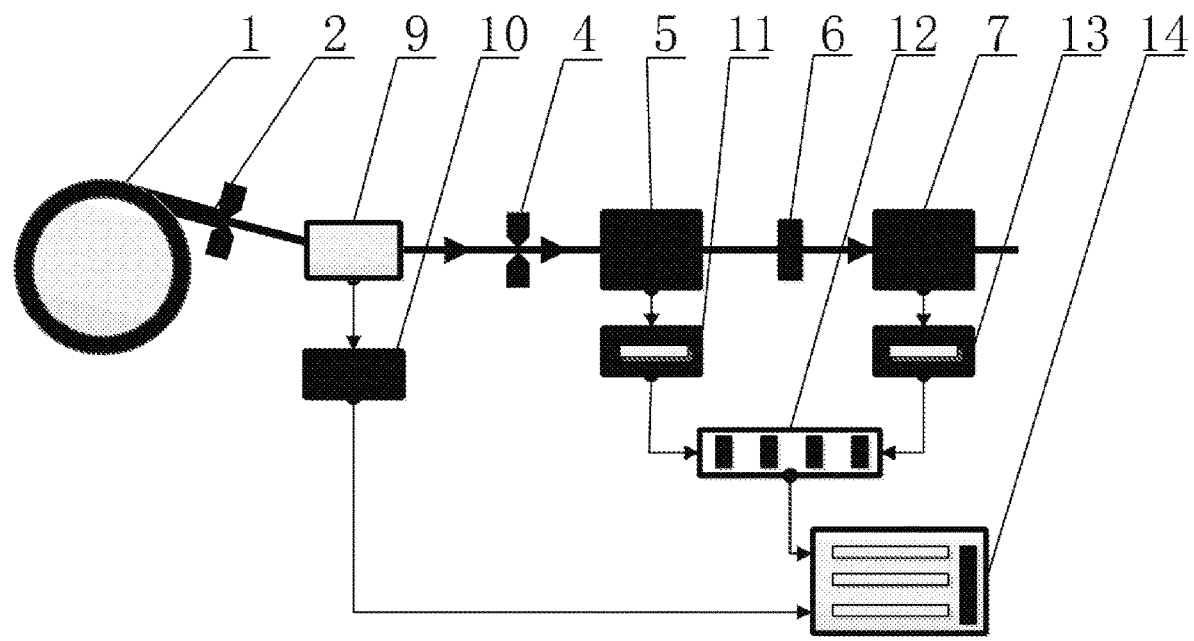
FIG. 2 shows the structure of the device for measuring time-resolved X-ray absorption spectrum of the present invention.
Figure 3:
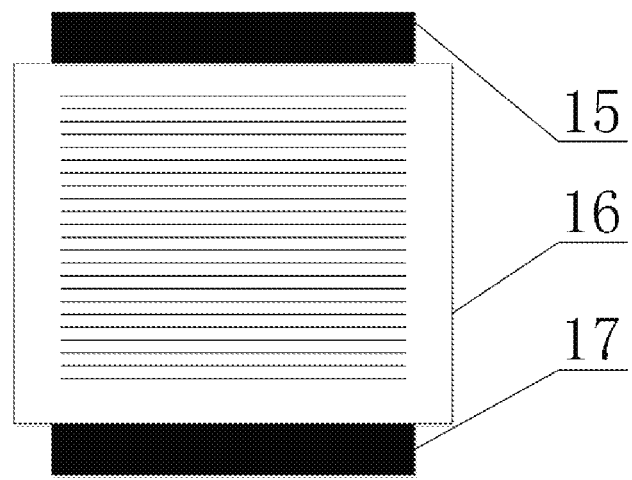
FIG. 3 shows the structure of the acousto-optic tunable X-ray filter.

In one embodiment of the present invention, the device for measuring time-resolved X-ray absorption spectrum, as shown in FIG. 2, mainly comprises an X-ray source 1, a first slit 2, an acousto-optic tunable X-ray filter 9, a radio frequency transmitter 10, a second slit 4, a front ionization chamber 5, a front ionization chamber signal amplifier 11, a sample to be tested 6, a rear ionization chamber 7, a rear ionization chamber signal amplifier 13, a data collector 12, and a computer 14. X-ray source 1 is used to provide the light source for X-ray absorption spectrum measurement, generally a synchrotron radiation accelerator; the complex X-ray beam emitted from the X-ray source 1 passes through the first slit 2 to form a high-quality X-ray beam; the first slit 2 has functions of limiting the aperture of the X beam and suppressing stray light; the collimated X beam passing through the first slit 2 is incident into the acousto-optic tunable X-ray filter 9, and a monochromatic X-ray beam is formed after the action of the acousto-optic tunable X-ray filter 9; the radio frequency transmitter 10 is used to provide a modulation signal for the acousto-optic tunable X-ray filter 9, thereby controlling the wavelength of the X-ray beam output by the acousto-optic tunable X-ray filter 9; the second slit 4 is used to limit the aperture of the X-ray beam output by the acousto-optic tunable X-ray filter 9 and suppress stray light; the front ionization chamber 5 is used to measure the intensity of the X-ray beam before passing through the sample; the rear ionization chamber 7 is used to measure the intensity of the X-ray beam after passing through the sample 6; the front ionization chamber signal amplifier 11 is used to amplify the output signal of the front ionization chamber 5; the rear ionization chamber signal amplifier 13 is used to amplify the output signal of the front ionization chamber 7; the data collector 12 is used to collect output signals of the front ionization chamber signal amplifier 11 and the rear ionization chamber signal amplifier 13; the computer 14 is used to control the radio frequency transmitter 10 and the data collector 12 to realize functions of fast data acquisition and data processing.

In the present invention, the acousto-optic tunable X-ray filter comprises a sound absorber 15, an X-ray crystal 16, and a piezoelectric crystal transducer 17.

The method for measuring in-situ time-resolved X-ray absorption spectrum of the present invention comprises the following steps:

(1) The wavelength of photon emitted by the acousto-optic tunable X-ray filter 9 is set to initial wavelength $\lambda_1$ by the radio frequency transmitter 10 according to the wavelength range of the X-ray absorption spectrum to be measured ($\lambda_1$, $\lambda_n$).

(2) Through the data collector 12, the front ionization chamber signal amplifier 11 and the rear ionization chamber signal amplifier 13, the front ionization chamber 5 and the rear ionization chamber 7 are used to simultaneously measure the intensity of the incident X-ray beam before passing through the sample to be tested 6 $I_0$ and the intensity of the incident X-ray beam passes through the sample to be tested 6 $I_1$, and the optical absorption coefficient $\mu_1$ of the sample to be tested 6 at the wavelength $\lambda_1$ position is calculated according to the following equation:

$$\mu_{\lambda_1} = \ln\frac{I_0}{I_1}. \tag{1.1}$$

(3) The wavelengths of photon emitted by the acousto-optic tunable X-ray filter 9 are sequentially set to $\lambda_2, \lambda_3 \ldots \lambda_{n-1}$ and $\lambda_n$ by the radio frequency transmitter 10; step ② is repeated at each wavelength position to obtain the optical absorption coefficient $\mu_{\lambda_2}, \mu_{\lambda_3} \ldots \mu_{\lambda_{n-1}}$ and $\mu_{\lambda_n}$ at each wavelength position.

(4) The X-ray absorption spectrum of the sample to be tested 6 in the wavelength range $(\lambda_2, \lambda_n)$ is drawn according to the optical absorption coefficient $\mu_{\lambda_3}, \mu_{\lambda_3} \ldots \mu_{\lambda_{n-1}}$ and $\mu_{\lambda_n}$.

The present invention does not have any movement of mechanical parts during the measurement process, and therefore can realize time-resolved measurement of X-ray absorption spectrum, and further has high measurement precision for X-ray absorption spectrum.

The specific embodiment described above further explain the objectives, technical solutions and beneficial effects of the present invention. It should be understood that the above description is only for the specific embodiment of the present invention, and is not intended to limit the present invention. Any modifications, equivalent substitutions, improvements, etc., which are made within the spirit and principles of the present invention, should be included in the scope of protection of the present invention.

We claim:

1. A device for measuring in-situ time-resolved X-ray absorption spectrum, comprising:
    an X-ray source (1),
    a first slit (2),
    an acousto-optic tunable X-ray filter (9),
    a radio frequency transmitter (10) having an input and sending out an excitation signal,
    a second slit (4),
    a front ionization chamber (5) having an output signal,
    a front ionization chamber signal amplifier (11),
    a sample to be tested (6),
    a rear ionization chamber (7) having an output signal,
    a rear ionization chamber signal amplifier (13),
    a data collector (12) having an output, and
    a computer (14) having an input and an output,
    wherein the first slit (2) and the acousto-optic tunable X-ray filter (9) are arranged sequentially along the light beam emitting direction of the X-ray source (1);
    the second slit (4), the front ionization chamber (5), the sample to be tested (6), and the rear ionization chamber (7) are arranged sequentially along the light beam emitting direction of the acousto-optic tunable X-ray filter (9);
    the output signal of the front ionization chamber (5) is amplified by the front ionization chamber signal amplifier (11), and then transmitted to the data collector (12);
    the output signal of the rear ionization chamber (7) is amplified by the rear ionization chamber signal amplifier (13), and then transmitted to the data collector (12);
    the output of the data collector (12) is connected with the input of the computer (14);
    the output of the computer (14) is connected with the input of the radio frequency transmitter (10); and
    the excitation signal sent by the radio frequency transmitter (10) is transmitted to the acousto-optic tunable X-ray filter (9).

2. The device of claim 1, wherein the acousto-optic tunable X-ray filter (9) further comprises
    a sound absorber (15),
    an X-ray crystal (16), and
    a piezoelectric crystal transducer (17).

3. A method for measuring in-situ time-resolved X-ray absorption spectrum by using the device of claim 1, comprising:
    (1) setting a wavelength of photon emitted by the acousto-optic tunable X-ray filter (9) to an initial wavelength $\lambda_1$ by the radio frequency transmitter (10) according to a wavelength range of an X-ray absorption spectrum to be measured $(\lambda_1, \lambda_n)$;
    (2) using the front ionization chamber (5) and the rear ionization chamber (7) through the data collector (12), the front ionization chamber signal amplifier (11), and the rear ionization chamber signal amplifier (13), to simultaneously measure an intensity $I_0$ of an incident X-ray beam before passing through the sample to be tested (6) and an intensity $I_1$ of the incident X-ray beam passes through the sample to be tested (6), and calculating an optical absorption coefficient $\mu_1$ of the sample to be tested (6) at the wavelength $\lambda_1$ position according to an equation:

$$\mu_{\lambda_1} = \ln\frac{I_0}{I_1}; \tag{1.1}$$

(3) sequentially setting wavelengths of photon emitted by the acousto-optic tunable X-ray filter (9) to $\lambda_2, \lambda_3 \ldots \lambda_{n-1}$ and $\lambda_n$ by the radio frequency transmitter (10), and repeating the step (2) at each wavelength position to obtain the optical absorption coefficient $\mu_{\lambda_2}, \mu_{\lambda_3} \ldots \mu_{\lambda_{n-1}}$ and $\mu_{\lambda_n}$ at each wavelength position; and
    (4) drawing an X-ray absorption spectrum of the sample to be tested (6) in the wavelength range $(\lambda_1, \lambda_n)$ according to the optical absorption coefficient $\mu_{\lambda_2}, \mu_{\lambda_3} \ldots \mu_{\lambda_{n-1}}$ and $\mu_{\lambda_n}$.

* * * * *